Patented Sept. 27, 1938

2,131,082

UNITED STATES PATENT OFFICE 2,131,082

PROCESS FOR PREPARING INTERMEDIATE FOR HORMONE PRODUCTION

John Weijlard, Rahway, N. J., assignor to Merck & Co. Inc., Rahway, N. J., a corporation of New Jersey No Drawing. Application January 9, 1937, Serial No. 119,754

4 Claims. (Cl. 260—131)

This invention relates to a process for the production of 3-chlor-etio-allocholanone-(17), suitable for use in the derivation of certain male sex hormones.

I have found a process for producing this important chlor-ketone from $\Delta^{5,6}$-3-chlor-etio-cholenone-(17).

According to my new improved process, $\Delta^{5,6}$-3-chlor-etio-cholenone-(17) is first reduced catalytically to 3-chlor-etio-allocholanol(-17) and then, by subsequent oxidation of the reaction product with chromic acid, the 3-chlor-etio-allocholanone-(17) is obtained.

In order to illustrate more particularly the manner in which my invention may preferably be practiced, a specific example is given below. It is to be understood, however, that the process thus specifically described is susceptible of some modification within the limits of the invention as set forth in the appended claims, and that I do not wish to be unnecessarily restricted thereto.

Example

About 0.16 gm. of $\Delta^{5,6}$-3-chlor-etio-cholenone-(17) is dissolved in 15 cc. of anhydrous ether and completely reduced with hydrogen in the presence of 0.1 gm. of platinum oxide. The mixture is filtered and the filtrate evaporated to dryness.

The reaction product is dissolved in about 10 cc. of glacial acetic acid. A solution of 0.06 gm. of chromic acid in 0.1 cc. of water and 2 cc. of glacial acetic acid is added, the mixture is warmed for 40 minutes at about 70° C., then diluted with water, and extracted with ether. The ether solution is washed with water, then alkali-solution, then again with water, and evaporated to dryness. The crude 3-chlor-etio-allocholanone-(17) may be recrystallized from methanol.

I claim as my invention:

1. A process for the production of 3-chlor-etio-allocholanone-(17) which comprises the complete reduction of $\Delta^{5,6}$-3-chlor-etio-cholenone-(17) with hydrogen in the presence of a platinum catalyst, and subsequent oxidation of the reaction product with chromic acid in glacial acetic acid.

2. In a process for the production of 3-chlor-etio-allocholanone-(17), the step which comprises the reduction of $\Delta^{5,6}$-3-chlor-etio-cholenone-(17) to 3-chlor-etio-allocholanol(-17) with hydrogen in the presence of a platinum catalyst.

3. In a process for the production of 3-chlor-etio-allocholanone-(17), the step which comprises the oxidation of 3-chlor-etio-allocholanol(-17) with chromic acid in glacial acetic acid.

4. A process for the production of 3-chlor-etio-allocholanone-(17) which comprises dissolving $\Delta^{5,6}$-3-chlor-etio-cholenone-(17) in anhydrous ether, completely reducing with hydrogen in the presence of platinum oxide, filtering, evaporating the filtrate, dissolving the reaction product in glacial acetic acid, adding a solution of chromic acid, warming the mixture, diluting with water, extracting with ether, washing the ether solution alternately with water and alkali-solution, evaporating, and recrystallizing the crude material from methanol.

JOHN WEIJLARD.